Feb. 26, 1963 E. O. KEIZER 3,079,461

AUTOMATIC CHROMA CONTROL

Filed Jan. 3, 1951

INVENTOR
EUGENE O. KEIZER

ATTORNEY 3,079,461

AUTOMATIC CHROMA CONTROL

Eugene Orville Keizer, Princeton, N.J., assignor to Radio Corporation of America, a corporation of Delaware
Filed Jan. 3, 1951, Ser. No. 204,110
5 Claims. (Cl. 178—5.4)

This invention relates to color television receivers and more particularly to novel methods of and means for automatically varying the frequency response of a television receiver.

It is customary to align color television receivers so as to have a flat overall frequency response. However, it has been found necessary in actual operation to adjust the high frequency response of the receiver to either a higher or lower value in order to obtain optimum results. The causes for such realignment are the result of several factors. Thus, it is known that the particular antenna in use, the distribution system and transmission lines, along with stray pickup and the like, can alter the apparent frequency response characteristics of the receiver. Antennas swaying in the wind or leads flapping in the wind can cause a fairly rapid fluctuation, while reflection from nearby surfaces, etc., may change from day to day, each capable of affecting at different rates the apparent frequency response of the receiver.

It has been found that the mere use of automatic gain control at the receiver is insufficient to correct this type of distortion. The reason for this will be clear when it is realized that automatic gain control circuits normally operate in accordance with information obtained by detection of the peak value of received scanning or deflection synchronizing signals. The scanning sychronizing signals are of a relatively low frequency as compared with the video frequencies and, as result, the above noted factors which vary the apparent high frequency response of the receiver may not cause a corresponding change in amplitude of the detected scanning synchronizing signals.

The effect of the change in apparent frequency response in black and white television systems is to cause a variation in resolution. A similar result occurs in color television systems of the field sequential type. However, in color television systems of the element sequential type where most of the color information appears in the higher frequency range, the effect may result in a deterioration of the colors or may even cause a complete loss of color.

In the element sequential type color television system, there is transmitted, in addition to the scanning sychronizing signals, a series of color synchronizing signals. These color synchronizing signals are generally transmitted at a frequency which lies in the upper portion of the video frequency range and is substantially centrally located with respect to the signals representing the color information. At the transmitter, the amplitude ratio of these two types of synchronizing signals is maintained constant. Thus, it will be clear that the apparent high frequency response of the receiver should be adjusted so as to maintain the same ratio between these sychronizing signals. If this is done, the receiver will amplify all of the signals equally and true color will be reproduced.

Accordingly, it is an object of this invention to provide novel methods of and means for using automatic frequency response correction in a color television receiver to maintain substantially constant frequency response characteristics over the entire range of signal information.

It is a further object of the invention to provide novel methods of and means for maintaining at the receiver a predetermined ratio between the peak-to-peak detected amplitude of scanning synchronizing signals and high frequency color synchronizing signals.

Still another object of the invention is to provide an amplifier having a variable frequency response controlled in accordance with the amplitude of a series of pulses of high frequency.

Briefly, in accordance with an embodiment of the invention, scanning synchronizing signals are utilized to maintain the gain of the receiver constant. Color synchronizing signals having a frequency lying in the color information band are rectified and used to develop a control voltage which is applied to a frequency responsive element in the video amplifier in such fashion that the high frequency response of the amplifier varies in inverse proportion to the level of the color synchronizing signals. In one embodiment of the invention the rectified color synchronizing signals produce a voltage which is applied to an absorption trap in the grid circuit of one of the video amplifiers. The trap has a high L/C ratio and is resonant to the frequency of the color synchronizing siganls. In another embodiment, the developed control voltage is applied to the load resistance of one of the amplifier tubes.

The above and other objects and advantages of the invention will become apparent upon a consideration of the following detailed description taken in conjunction with the accompanying drawings in which.

While the invention may be used with any color television system using scanning synchronizing signals and color synchronizing signals, it is of particular advantage in those systems wherein the color synchronizing signals are transmitted at high frequency. Accordingly, the invention will be described in connection with a system of the element sequential type. It is to be understood, however, that the invention is not intended to be limited thereto. It is also to be understood that certain phases of the invention are of general application to fields other than color television. Thus, the particular amplifiers disclosed and the methods of and means for varying their frequency response in accordance with the invention are equally applicable to frequency shift keying systems, multicarrier telephony systems and the like where signal pulses of different frequencies are to be equally amplified. Another field of usefulness is for black and white systems using dot interlace for increased horizonal resolution and wherein the dot frequency information is in the form of bursts of high frequency.

Figure 1:
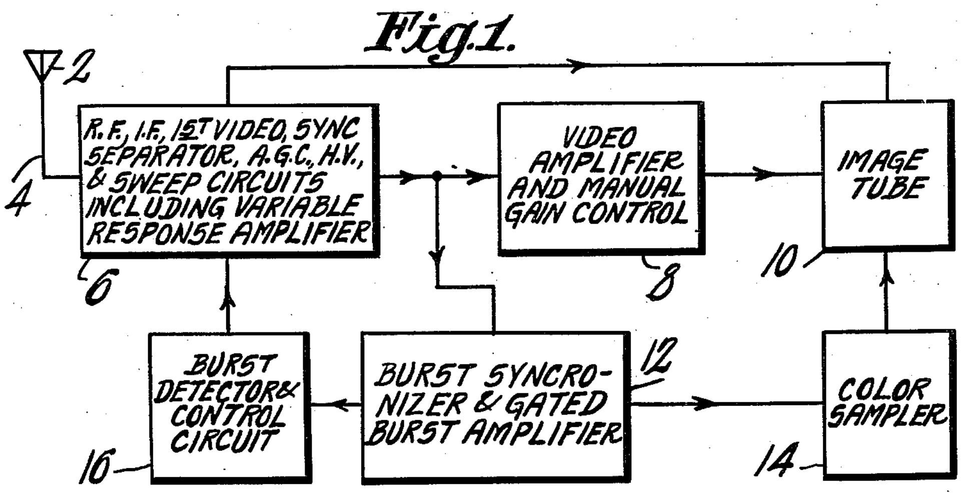
FIGURE 1 represents in block diagram an embodiment of the invention as applied to a color television receiver.

Referring to FIGURE 1, color television signals are picked up by the antenna 2, and fed by a suitable transmission line 4 to the receiver. That much of the receiver which includes the RF, IF and first video amplifiers together with the synchronizing signal separation circuits, the automatic gain control circuits and sweep circuits are included within the box 6. These circuits are all straightforward and their operation well known to those skilled in the art. The output from the first video amplifier is fed to a final amplifier 8 and applied to the image tube 10. The application of the image signals and scanning voltages to the image tube is also quite normal and no further description is believed warranted in this discussion. It will be noted that no attempt has been made to indicate the audio circuits since they play no part in the present invention.

The color synchronizing signals which, in the embodiment chosen for purposes of illustration, are of high frequency and appear as a burst on the back porch of the scanning synchronizing signals are applied to the burst synchronizer 12 which includes a gated burst amplifier. The output from the burst amplifier is applied to the color sampler 14 which keys the image tube at the proper time to cause the proper color phosphor to be activated.

This much of the circuitry of FIGURE 1 is of standard construction and the operation thereof is not believed to require further explanation. However, for those who may be interested in a more detailed description reference may be had to the publications "Synchronization for Color Dot Interlace in the RCA Color Television System," October 1949, and "General Description of Receivers for the RCA Color Television System Which Employ the RCA Direct-View Tri-Color Kinescopes," April 1950.

In accordance with the invention, the amplified bursts are fed to a burst detector 16 and its associated circuits. The burst detector develops a voltage the amplitude of which varies directly with the level of the amplified burst. This voltage is fed to the video amplifier in such fashion as to vary its frequency response in inverse proportion to the level of the burst. It is preferable, but not necessary, that the control be such that the response is varied after the automatic gain control circuits have set the gain of the RF and IF portions of the receiver.

Figure 2:
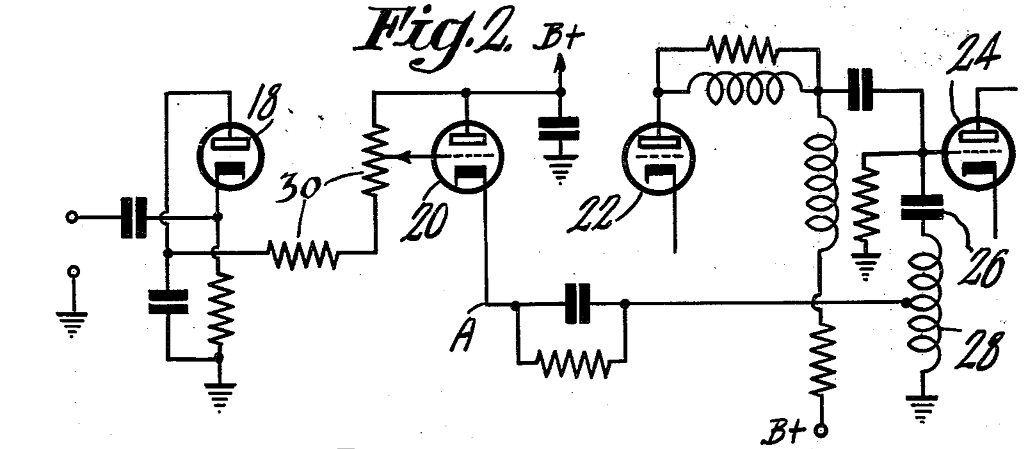
FIGURE 2 represents schematically one circuit which may be used with the invention; and, FIGURE 3 represents schematically a variation of the circuit of FIGURE 2 which also may be used with the invention.

Several circuits may be used to accomplish the beneficial results of the invention. One such circuit is shown in FIGURE 2. Referring to that figure it will be seen that the amplified burst is applied to a detector 18 through a condenser. The output of the detector is fed to the control tube 20. The tubes 22 and 24 represent a pair of cascaded tubes in the video amplifier. The second tube 24 has an absorption trap in its grid circuit consisting of the series connected condenser 26 and tapped inductance 28. The absorption trap is designed to have a high L/C ratio and to be resonant at the color synchronizing signal frequency. The output of the control tube 20 is fed to the tap on the inductance 28 through an R-C network.

The operation of the circuit shown in FIGURE 2 will now be described. The receiver overall response is tuned so that in the absence of the absorption trap but with a condenser of equivalent value to that of condenser 26 in the grid circuit of tube 24, the burst frequency is definitely accentuated. Now, with the trap in, a low level of burst amplitude appearing in the input will cause the detector 18 to develop only a small negative D.-C. voltage and the control tube will be strongly conducting, thereby loading the absorption trap to the point where the effect of the condenser and inductance of the trap will be more nearly like that of the condenser alone. Thus, the effect will be to accentuate the frequency range of the receiver in which the color synchronizing signals lie and hence, bring them back to the desired ratio with respect to the scanning synchronizing signals. At a certain level of burst amplitude the negative rectified voltage from the detector will be sufficient to begin biasing off the control tube and thereby unload the absorption trap. The level required to accomplish this will be a function of the voltage divider 30 between the B+ supply and the plate of the rectifier. By making the point at which the grid of the control tube is tapped adjustable the point at which the synchronizing signals have the proper ratio may be made to coincide with the desired flat overall response characteristic of the amplifier. It will be clear that the presence of a high level burst will produce the opposite effect and accordingly the frequency response of the amplifier will be maintained at the point giving a constant ratio of the scanning and color synchronizing signals. As explained above, this results in the color information signals being amplified to a proper degree to give true color reproduction. The video amplifier stage to which this arrangement is applied may be either ahead of or following the point at which scanning sync signals are removed from which gain control voltages are developed.

Figure 3:
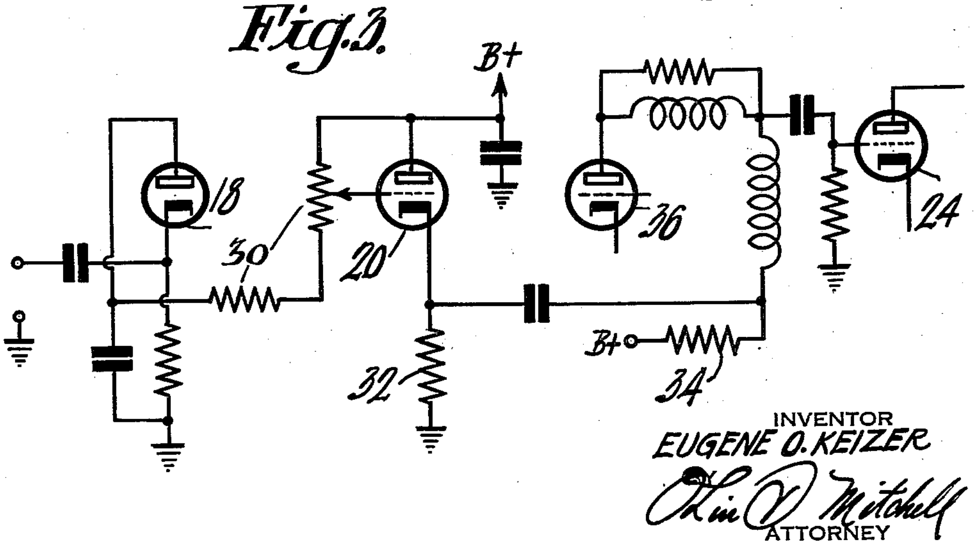

The circuitry of FIGURE 2 may be modified and the control voltages applied to the video amplifier in a different manner by the circuitry shown in FIGURE 3. Referring to FIGURE 3 it will be seen that the control voltages which appeared at point A of FIGURE 2 are passed to ground through resistor 32 rather than to an absorption trap. These voltages are also applied to the load resistor 34 of one of the amplifying tubes 36 of the video amplifier chain, through a condenser. This circuit is applied to the video amplifier ahead of the point where the scanning sync signals are obtained to develop the automatic gain control signals for the receiver.

The operation of this modification will now be described. The control tube cathode resistor 32, the load resistor 34 and the cathode input impedance of the control tube form the resistive load of the video amplifier 36, effective in the frequency range of the scanning synchronizing signals. The degree of conduction of the control tube therefore determines the effective load resistance. Since, as explained above, the automatic gain control will tend to keep the level at the scanning synchronizing signal frequency constant, that is, the height of the scanning signals constant, variations in the scanning signal response with respect to the color synchronizing signal response still result in the apparent effect that the scanning signal response stays constant while the high frequency response varies relative to it. As in the circuit shown in FIGURE 2, the point at which the control tube 20 begins to conduct is determined by the setting of the voltage divider 30 and the amplitude of the burst signal. When the burst amplitude starts to increase, the increased negative detected voltage causes the control tube to decrease conduction and the video amplifier load resistance to increase. The resulting automatic gain control action decreases the overall gain of the receiver resulting in decreased high frequency response which tends to maintain the burst signal amplitude constant.

As a modification of the above described method of maintaining constant the ratio between scanning signals and synchronizing signals, the advantages of the invention may be attained by maintaining a constant ratio between the amplitude of the color synchronizing pulses and the D.C. level of those pulses. The application of this modification of the invention to the receiver to vary the frequency response thereof in accordance with the principles set forth above is apparent. By suitable circuitry, a control voltage can easily be obtained which will vary in accordance with the ratio of color synchronizing signal amplitude to the D.C. component of the color synchronizing signal. This control voltage is applied to the receiver in such a manner as to vary its frequency response so as to maintain the ratio constant.

While the above described circuits are designed to accomplish the objects of the invention other arrangements are possible. Thus the Miller effect may be used, thermal automatic frequency control circuits or reactance tube circuits may be used and the variable frequency response effect may be produced in the receiver by application of the desired effect to the RF or IF portions of the receiver as well as to the video circuits.

What is claimed is:

1. In a color television receiver adapted to reproduce images in color in response to composite image signals having a given frequency spectrum and having a plurality of components including a color subcarrier wave whose amplitude is fixed during predetermined intervals and during other intervals is a function of color saturation of a plurality of color aspects, and a periodically recurrent synchronizing component representative of television picture scanning synchronizing information, the combination comprising: a signal amplifier for processing said color subcarrier component and having an input circuit for receiving said color subcarrier component, an output circuit for developing a processed version of said color subcarrier component, and gain controlling means; means responsive to said processed version of said color subcarrier component developed in the output circuit of said amplifier for producing a control signal in accordance with the amplitude of said subcarrier component occurring during said predetermined intervals; and means for impressing said produced control signal upon the gain controlling means of said amplifier in a manner to vary the gain of said amplifier inversely to any amplitude variations of said subcarrier component occurring during said predetermined intervals.

2. In a color television receiver adapted to reproduce images in color in response to composite image signals having a given frequency spectrum and having a plurality of components including a color subcarrier wave whose amplitude is fixed during predetermined intervals and during other intervals is a function of color saturation of a plurality of color aspects, and a periodically recurrent synchronizing component representative of television picture scanning synchronizing information, the combination comprising: a signal amplifier for processing said color subcarrier component and having an input circuit for receiving said color subcarrier component, an output circuit for developing a processed version of said color subcarrier component, and gain controlling means; means responsive to the processed version of that portion of said color subcarrier component occurring during said predetermined intervals and developed in the output circuit of said amplifier for producing a control signal in accordance with the amplitude of said subcarrier component occurring during said predetermined intervals; and means for impressing said produced control signal upon the gain controlling means of said amplifier in a manner to vary the gain of said amplifier inversely to any amplitude variations of said subcarrier component occurring during said predetermined intervals.

3. In a color television receiver adapted to reproduce images in color in response to composite image signals having a given frequency spectrum and having a plurality of components including a color subcarrier wave whose amplitude is fixed during predetermined intervals and during other intervals is a function of color saturation of a plurality of color aspects, and a periodically recurrent synchronizing component representative of television picture scanning synchronizing information, the combination comprising: a signal amplifier for amplifying said composite image signals and having an input circuit for receiving said composite signals, an output circuit for developing an amplified version of said composite signals, and means for varying the gain of said amplifier at frequencies in the range of said color subcarrier wave independently of other frequencies of said composite signals; means coupled to the output circuit of said amplifier for separating the amplified version of said color subcarrier wave occurring during said predetermined intervals; a rectifier coupled to said separating means for developing a control signal in accordance with the amplitude of said subcarrier component occurring during said predetermined intervals; and means or impressing said control signal upon the gain varying means of said amplifier in a manner to vary the gain of said amplifier inversely to any amplitude variations of said subcarrier component occurring during said predetermined intervals.

4. In a color television receiving system of a type adapted to receive a composite color television signal which includes a deflection synchronizing component having a first fixed amplitude, a color subcarrier component the phase of which represents multicolor hue information and the amplitude of which represents multicolor saturation information, and a color synchronizing component comprising a number of cycles of a second fixed amplitude wave having the same frequency as that of said color subcarrier component, said deflection synchronizing component and said color synchronizing component being at substantially opposite extremities at the frequency band occupied by said composite television signal, an automatic control circuit which acts to maintain a predetermined relationship in amplitude between said deflection synchronizing component and said color synchronizing component comprising in combination: amplifier means having an input circuit for receiving said composite color television signal, an output circuit, and means for altering the effective frequency response of said amplifier means in a range of signal frequencies corresponding to that occupied by said color subcarrier component and its sidebands; means coupled to the output circuit of said amplifier means for developing a control voltage representative of deviations from said predetermined amplitude relationship between said deflection synchronizing component and said color synchronizing component; means coupling said control voltage developing means and said means for altering the effective frequency response of said amplifier means for impressing said control voltage on said amplifier means to thereby regulate the amplitude of those signals developed in the output circuit of said amplifier means corresponding to said color subcarrier and its sidebands; and automatic gain control means coupled to said amplifier means and responsive to said synchronizing component for regulating the overall gain of said amplifier means for said entire composite color television signal as a function of the amplitude of said synchronizing component.

5. In a color television receiving system of a type adapted to receive a composite color television signal which includes a deflection synchronizing component and a color subcarrier component, the relative phase of said subcarrier component representing multicolor hue information and the relative amplitude of said subcarrier component representing multicolor saturation information, said synchronizing component and said subcarrier component being at substantially opposite extremities of the frequency band occupied by said composite television signal, an automatic control circuit which acts to maintain a predetermined relationship in amplitude between said synchronizing component and said subcarrier component comprising in combination: amplifier means having an input circuit for receiving said composite color television signal, an output circuit for producing an amplified version of said composite color television system, and means for altering the effective frequency response of said amplifier means in a range of signal frequencies corresponding to that occupied by said color subcarrier component and its sidebands; means coupled to the output circuit of said amplifier means for developing a control voltage representative of deviations from normal of the amplitude of said color subcarrier component; means coupling said control voltage developing means and said means for altering the effective frequency response of said amplifier means for impressing said control voltage on said amplifier means to thereby regulate the amplitude of only those signals developed in the output circuit of said amplifier means corresponding to said color subcarrier and its sidebands; and automatic gain control means coupled to said amplifier means and responsive to said synchronizing component for regulating the overall gain of said amplifier means for said entire composite color television signal as a function of the amplitude of said synchronizing component.

References Cited in the file of this patent

UNITED STATES PATENTS

| | | |
|---|---|---|
| 2,078,762 | Holst | Apr. 27, 1937 |
| 2,094,073 | Landon | Sept. 28, 1937 |
| 2,096,760 | Purington | Oct. 26, 1937 |
| 2,148,030 | McLennan | Feb. 21, 1939 |
| 2,251,929 | Freeman et al. | Aug. 12, 1941 |

(Other references on following page)

UNITED STATES PATENTS

| | | |
|---|---|---|
| 2,262,846 | Herold | Nov. 18, 1941 |
| 2,296,919 | Goldstine | Sept. 29, 1942 |
| 2,355,701 | Bradley | Aug. 15, 1944 |
| 2,378,797 | Schade | June 19, 1945 |
| 2,586,760 | Bedford | Feb. 19, 1952 |
| 2,635,140 | Dome | Apr. 14, 1953 |
| 2,798,900 | Bradley | July 9, 1957 |

FOREIGN PATENTS

| | | |
|---|---|---|
| 848,207 | France | Oct. 25, 1939 |